E. LATHAM.
AUTOMOBILE SPRING.
APPLICATION FILED SEPT. 24, 1915.
1,187,345.
Patented June 13, 1916.
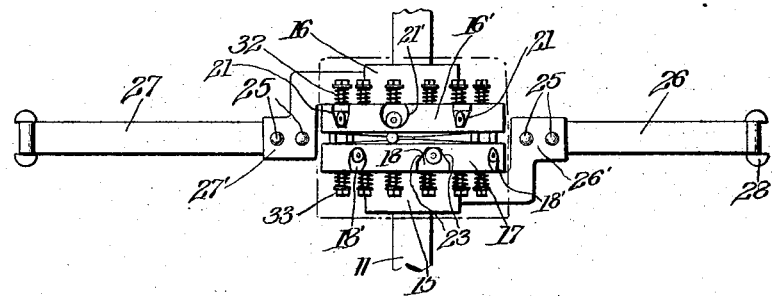
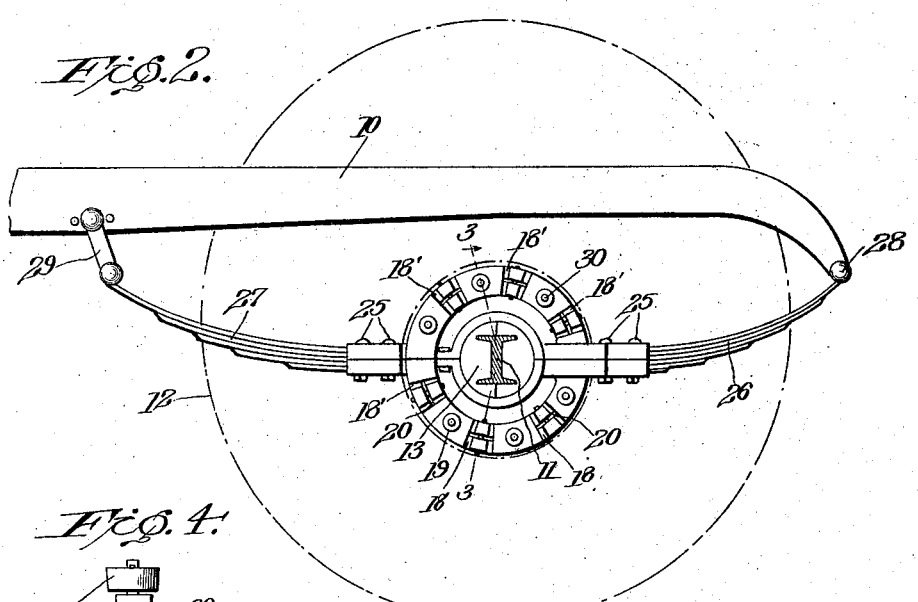
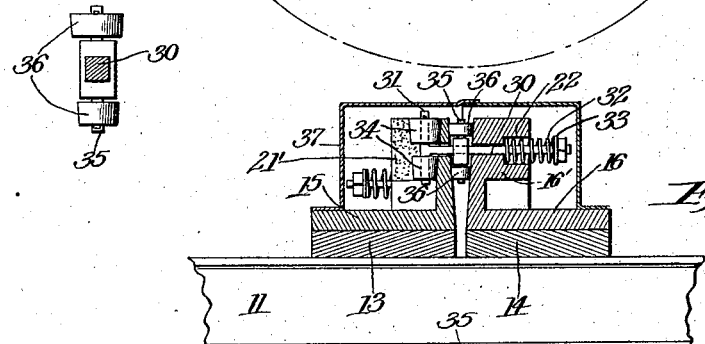
Inventor
Edgar Latham

UNITED STATES PATENT OFFICE.

EDGAR LATHAM, OF ATLANTA, GEORGIA.

AUTOMOBILE-SPRING.

1,187,345.   Specification of Letters Patent.   Patented June 13, 1916.

Application filed September 24, 1915. Serial No. 52,413.

*To all whom it may concern:*

Be it known that I, EDGAR LATHAM, a citizen of the United States, residing at Atlanta, Fulton county, State of Georgia, have invented certain new and useful Improvements in Automobile-Springs, of which the following is a specification.

This invention relates to shock absorbers for vehicles and more particularly for motor vehicles.

It is one of the objects of the invention to provide a shock absorber which will be a part of the usual vehicle spring and take up the road shocks without having these shocks transmitted to the spring and thence to the vehicle frame.

A further object is to provide a construction which may be fitted to vehicles in use in place of the regular springs and without a necessity for providing new axles.

Other objects and the features of novelty will be apparent from the following description, taken in connection with the accompanying drawings, in which, Figure 1 is a plan view of a shock absorber embodying my invention, the casing therefor being removed; Fig. 2 is a side elevation thereof; Fig. 3 is an enlarged section on the line 3—3 of Fig. 2; and Fig. 4 is an enlarged detail of one of the roller bearings.

Referring to the drawings, 10 indicates a side member of a vehicle frame, 11 an axle and 12 a road wheel. Arranged on the axle 11 are the bearing members 13 and 14 on which the sleeves 15 and 16 are journaled. The sleeve 15 is provided with a flange 17 having a series of cam grooves 18 and 18' in one side thereof, the grooves 18 being wedge shaped and the grooves 18', which alternate with the grooves 18, being circular in cross section. The flange 17 is also provided with a series of recesses 19 arranged between the grooves 18, 18'. Circumferentially extending slots 20 are arranged in the flange 17 registering with the grooves 18, 18'.

The flange 16' of sleeve 16 has a series of cam grooves 21 and 21' similar to the grooves 18, 18', respectively, and recesses 22 similar to the recesses 19. From Fig. 3 it will be apparent that the cam grooves 18 and 18' register with the recesses 22 and the cam grooves 21 and 21' register with the recesses 19. The cam grooves 18' and 21' are preferably narrower than the grooves 18 and 21, for a purpose to be hereinafter described. In order to conveniently arrange the sleeves 15 and 16 on the bearing members 13 and 14, respectively, said sleeves may be in halves and secured together by bolts 25, these bolts also serving to clamp the leaf springs 26 and 27 to the extensions 26' and 27' of the sleeves. The spring 26 is pivotally connected with the frame 10 at 28 and the spring 27 has a shackle connection 29 with the frame, this being the usual mode of connecting springs to motor vehicle frames. A series of bolts 30, having cross arms or heads 31 in the grooves 18 and 21, extend through the flanges 16' and 17, as clearly shown in Fig. 3, and carry springs 32 which are normally compressed between one of the flanges and suitable washers or abutments 33 on the bolts. The heads 31 carry the rollers 34 which fit the cam grooves 18, 18', 21 and 21', the grooves being arranged radially in the flanges. The bolts 30 pass through the circumferentially extending slots 20 which permit relative rotary movements between the flanges. The bolts 30 and springs 32 thus form a yieldable connection between the flanges 16' and 17 which permit a restricted relative rotation, the rollers 34 running up the inclined surfaces 23 during this relative rotation. The springs 32 also tend to draw the flanges 16' and 17 together and, in order to provide an anti-friction bearing between the flanges, shafts 35 for the rollers 36 are arranged on the bolts 30, the latter being preferably of rectangular cross section, as shown in Fig. 4, for the purpose of preventing the shafts 35 from swinging out of their proper position. The series of rollers 36 thus hold the flanges 16' and 17 separated by a definite minimum distance and permit one flange to freely move relatively to the other.

In the operation of the shock absorber, the tension of the springs 32 normally holds the rollers 34 at the bottoms of the grooves 18, 18', 21 and 21', but whenever the axle is suddenly thrown upwardly the shock will be taken up by the rollers 34 running up the inclined surfaces of the grooves, the inclined surfaces of the grooves causing the springs 32 to be compressed to take up the shocks and the grooves 18' and 21' serving to limit the movement of the rollers 34 without jolts.

The flanges 16' and 17 may be inclosed in suitable housings 37 and 38 which may be telescoped as indicated at 39 but arranged to rotate independently with the sleeves 15 and 16 to which they are attached.

Having thus described the invention, what is claimed and desired to be secured by Letters Patent is:

1. In a device of the class described, the combination of a frame, an axle, two opposed members rotatably mounted on said axle, springs secured to each of said members and connected with said frame, spring means yieldably clamping said members together adapted to permit the members to turn independently on the axle, and a thrust bearing between said members.

2. In a device of the class described, the combination of a frame, an axle, two opposed members rotatably mounted on said axle, springs secured to each of said members and connected with said frame, bolts extending through said members and movable axially relatively to both members and circumferentially relatively to one member, and springs coöperating with said bolts to yieldably clamp said members together.

3. In a device of the class described, the combination of a frame, an axle, two opposed members rotatably mounted on said axle, one of said members having a series of cam grooves therein and the other member having a corresponding series of openings, springs secured to each of said members and connected with said frame, bolts connecting said members together and movably fitting said cam grooves and extending through said openings, and springs on said bolts adapted to yieldably clamp said members together.

4. In a device of the class described, the combination of a pair of opposed rotatably supported members, one of said members having a series of cam grooves therein and the other member having a corresponding series of openings, springs secured to each of said members, bolts extending through said members, rollers carried by said bolts and fitting said cam grooves, and springs on said bolts for yieldably clamping said members together.

5. In a device of the class described, the combination of two rotatably supported members, one of said members having a series of cam grooves and circumferentially extending slots registering with said cam grooves, bolts extending through said slots and through openings in the other of said members, rollers on said bolts fitting said cam grooves, and springs on said bolts for yieldably clamping said members together.

6. In a device of the class described, the combination of two rotatably supported members, one of said members having a series of cam grooves therein and circumferentially extending slots registering with said grooves and the other of said members having openings which also register with said grooves, bolts extending through said slots and openings and having heads arranged in said grooves, rollers on said heads fitting said grooves, springs on said bolts for yieldably clamping said members together, and rollers carried by said bolts between said members and adapted to form an anti-friction bearing therebetween.

In testimony whereof I affix my signature.

EDGAR LATHAM.

Copies of this patent may be obtained for five cents each, by addressing the "Commissioner of Patents, Washington, D. C."